United States Patent
Li

(10) Patent No.: US 11,323,454 B1
(45) Date of Patent: May 3, 2022

(54) SYSTEMS AND METHODS FOR SECURING COMMUNICATIONS

(71) Applicant: Symantec Corporation, Mountain View, CA (US)

(72) Inventor: Qing Li, Cupertino, CA (US)

(73) Assignee: NortonLifeLock Inc., Tempe, AZ (US)

( * ) Notice: Subject to any disclaimer, the term of this patent is extended or adjusted under 35 U.S.C. 154(b) by 607 days.

(21) Appl. No.: 16/262,275

(22) Filed: Jan. 30, 2019

(51) Int. Cl.
*H04L 29/06* (2006.01)

(52) U.S. Cl.
CPC ........ *H04L 63/105* (2013.01); *H04L 63/0421* (2013.01); *H04L 63/104* (2013.01); *H04L 63/20* (2013.01)

(58) Field of Classification Search
CPC . H04L 63/105; H04L 63/0421; H04L 63/104; H04L 63/20; H04L 63/04; H04L 63/0407; H04L 63/10
See application file for complete search history.

(56) References Cited

U.S. PATENT DOCUMENTS

| 2011/0072142 A1* | 3/2011 | Herz | G06F 21/6254 |
| | | | 709/229 |
| 2013/0066940 A1* | 3/2013 | Shao | H04L 67/1025 |
| | | | 709/201 |
| 2015/0135302 A1* | 5/2015 | Cohen | H04L 63/0281 |
| | | | 726/12 |

\* cited by examiner

*Primary Examiner* — Edward Zee
(74) *Attorney, Agent, or Firm* — FisherBroyles, LLP

(57) ABSTRACT

The disclosed computer-implemented method for securing communications may include (i) establishing an overlay network within a publicly available on-demand cloud computing platform, the overlay network enabling secure communications between devices by maintaining within the overlay network a services mapping table that defines access rights to at least one of shared data or services, and (ii) transferring data, by the overlay network acting as an intermediary, from a first device that has securely connected to the overlay network to a second device that has securely connected to the overlay network, in accordance with the access rights defined in the services mapping table. Various other methods, systems, and computer-readable media are also disclosed.

20 Claims, 12 Drawing Sheets

| Services Mapping Table 122 | | | | |
|---|---|---|---|---|
| Granting User Name | Service Type | Resources | Receiving User Name | Access Rights |
| A | File Sharing | Directory | B | Read |
| A | File Sharing | Directory | C | Read/Write |
| A | File Sharing | File X | B | Read |
| A | Remote Device Control | Thermostat | C | Read |
| A | Remote Device Control | Camera | E | Set |
| A | Remote Device Control | Door | B | Set |

| Access Table 720 | | | | |
|---|---|---|---|---|
| User Name | Service Ports | Current IP | Online Status | Notify Method |
| A | TCP 80 | AWS 1.2.3.4 | Active | SMS |
| B | TCP 80; UDP 32; TCP 880 | AWS 100.1.3.7 | Active | IN-APP |
| C | TCP 443 | AWS 200.10.10.9 | Offline | PHONE CALL |

*FIG. 8*

SYSTEMS AND METHODS FOR SECURING COMMUNICATIONS

BACKGROUND

A typical home computer network connects to the Internet through a home gateway router commonly installed by a service provider. This home router typically has built-in firewall features. This router firewall protects the home computer network.

When a home user wants to make files that are stored on a home computer accessible to other users on the Internet, the home user must configure the router firewall to allow for incoming file access requests. For example, if the home user runs the MICROSOFT WINDOWS OS that uses the COMMON INTERNET FILE SERVICE ("CIFS") protocol to facilitate file sharing, and CIFS runs on UDP ports 137 and 138 and TCP ports 139 and 445, then the home user must configure the router firewall to allow for incoming connections to UDP ports 137 and 138 and TCP ports 139 and 445. Another illustrative scenario would involve the home user wanting to remotely access his or her home security system's video camera at work using a smart phone. In this additional scenario, the home user must also configure the router firewall to enable connection requests on TCP port 554.

Since the firewall running in the router must open these service ports, as outlined above, these scenarios create a large attack surface in terms of network security. In other words, attack traffic will penetrate through the network gateway and reach the actual computer and other connected devices inside of the home network. For example, the attack traffic will reach the home computer that is sharing the files and the attack traffic will also reach the home security camera control system. This type of attack is possible because the home router has a public Internet protocol address that is visible on the Internet. The attacker will subsequently probe for open ports and will discover open ports for UDP ports 137 and 138 and TCP ports 139, 445, and 554. Once the attacker discovers these open ports, the attacker will make connect requests to these ports, and the router firewall will allow this attack traffic to pass through into the home network. The instant disclosure, therefore, identifies and addresses a need for improved systems and methods for securing communications.

SUMMARY

As will be described in greater detail below, the instant disclosure describes various systems and methods for securing communications. In one example, a computer-implemented method for securing communications may include (i) establishing an overlay network within a publicly available on-demand cloud computing platform, the overlay network enabling secure communications between devices by maintaining within the overlay network a services mapping table that defines access rights to at least one of shared data or services and (ii) transferring data, by the overlay network acting as an intermediary, from a first device that has securely connected to the overlay network to a second device that has securely connected to the overlay network, in accordance with the access rights defined in the services mapping table.

In one embodiment, the overlay network may include a zero trust network. In one embodiment, the overlay network enables secure communications between devices by further maintaining within the overlay network an access table that maintains a record in part of which target Internet protocol address of the publicly available on-demand cloud computing platform the first device used to connect to the overlay network. In one embodiment, the target Internet protocol address is ephemeral.

In one embodiment, the access table further defines (i) which services a connected user provides to other users, (ii) which data the connected user provides to other users, (iii) an indication that the connected user is actively connected, (iv) an indication of how the connected user prefers to be notified when other users belonging to a same user group become active, (v) an indication of when at least one service corresponding to another user becomes active, and/or (vi) an indication of when at least one shared data item corresponding to another user becomes active. In one embodiment, the first device and the second device securely connect to the overlay network using network communications conforming to (i) the INTERNET PROTOCOL SECURITY (IPSEC) protocol, (ii) the TRANSPORT LAYER SECURITY protocol, (iii) the SECURE SOCKETS LAYER protocol, (iv) the SECURE SHELL protocol, and/or (v) a public key infrastructure.

In one embodiment, the overlay network permits a user account to publish protected data that a user account can make available to another user account and/or a service that the user account can make available to the other user account. In one embodiment, the overlay network permits the user account to publish at least one of the protected data and the service in a location independent manner such that publishing occurs regardless of a current location of a user corresponding to the user account. In one embodiment, the overlay network enables multiple devices to access at least one of the protected data and the service such that N-to-N communications are permitted as distinct from being limited to either 1-to-1 or 1-to-N communications.

In one embodiment, the overlay network effectively reduces port exposure at a local network gateway through which the first device connects to the overlay network by enabling a user corresponding to the first device to close a service port of a firewall at the local network gateway and, instead of transferring the data across the service port, transferring the data using the overlay network as the intermediary. In one embodiment, transferring data, by the overlay network acting as the intermediary, further includes transferring data from a first party corresponding to the first device to a second party corresponding to the second device and at least one of the first party and the second party is anonymous from a perspective of the other party. In one embodiment, at least of the first party and the second party is anonymous from the perspective of the other party such that the anonymous party uses an anonymized user account identifier. In one embodiment, transferring the data is performed without data caching inside the overlay network such that the data passes from the first device to the second device in a pass-through manner with respect to the overlay network.

In one embodiment, a system for implementing the above-described method may include (i) an establishment module, stored in memory, that establishes an overlay network within a publicly available on-demand cloud computing platform, the overlay network enabling secure communications between devices by maintaining within the overlay network a services mapping table that defines access rights to at least one of shared data or services, (ii) a transferring module, stored in memory, that transfers data, as part of the overlay network acting as an intermediary, from a first device that has securely connected to the overlay network to a second device that has securely connected to the overlay network, in accordance with the access rights defined in the services mapping table, and (iii) at least one physical processor configured to execute the establishment module and the transferring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) establish an overlay network within a publicly available on-demand cloud computing platform, the overlay network enabling secure communications between devices by maintaining within the overlay network a services mapping table that defines access rights to at least one of shared data or services and (ii) transfer data, by the overlay network acting as an intermediary, from a first device that has securely connected to the overlay network to a second device that has securely connected to the overlay network, in accordance with the access rights defined in the services mapping table.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 8 is a block diagram of an illustrative services mapping table and an illustrative access table.

Figure 1:
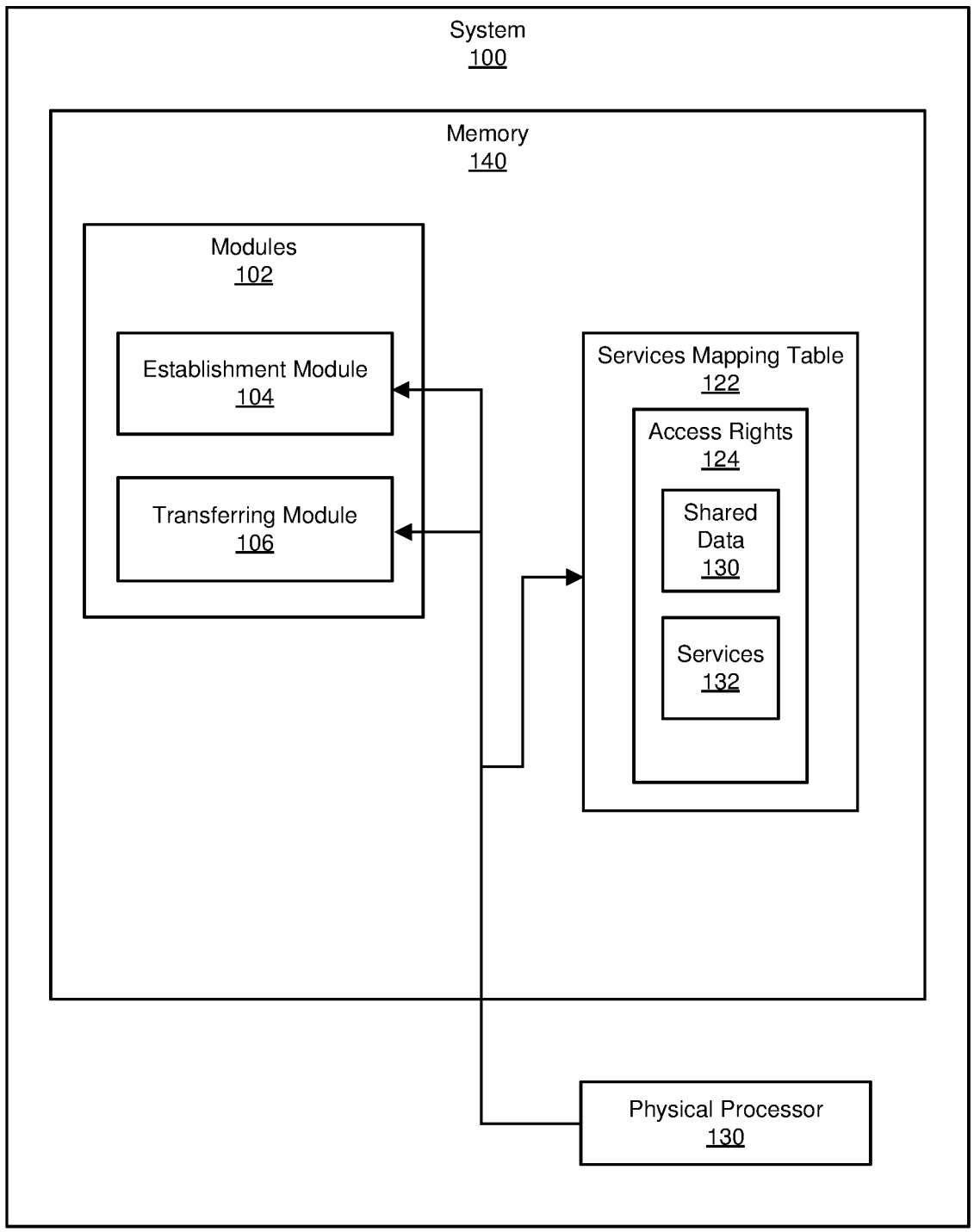
FIG. 1 is a block diagram of an example system for securing communications.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for securing communications. The disclosed subject matter may improve upon related systems by enabling a user to transfer files remotely across a wide area network such as the Internet while avoiding the opening of typical file transfer service ports (e.g., UDP ports 137 and 138 and TCP ports 139, 445, and 554) within a firewall of a local network gateway. The disclosed subject matter may achieve these benefits by leveraging the inventive insight that a secure communications solution may be established, in the form of an overlay network, within a publicly available on-demand cloud computing platform, such as AMAZON AWS, MICROSOFT AZURE, etc. For example, one or more of these secure communications overlay networks may be established by appropriately configuring and connecting two or more network nodes, network components, and/or virtual machines within the cloud computing platform, and further by executing software within these network nodes for managing and facilitating secure communications in accordance with method 300, which is discussed in more detail below.

After establishing one or more of these new and inventive secure communications overlay networks within a publicly available on-demand cloud computing platform, then user accounts may be able to connect to these corresponding overlay networks and thereby use the networks as secure communications proxies. For example, the user accounts may securely log into the overlay networks using an encrypted or otherwise secure communication channel, such as a secure communication channel conforming to the INTERNET PROTOCOL SECURE protocol or IPSEC protocol, thereby preventing one or more Internet protocol addresses within corresponding home networks of the user accounts from becoming publicly exposed outside of the home networks.

For example, Internet protocol address translation information may be kept private and secure within the overlay networks, thereby preventing exposure of this information to outside of the overlay networks. Additionally, or alternatively, in some scenarios the overlay networks may provide access point Internet protocol addresses, which may optionally correspond to edge routers or edge network nodes of the cloud computing platform and entrance points into the overlay networks, to user accounts in order for the user accounts to use these Internet protocol addresses to access the overlay networks. In further examples, these access point Internet protocol addresses may be ephemeral, transient, dynamically changing, and/or kept private and secure between the overlay networks and one or more authenticated user accounts, etc. Similarly, when connecting to the overlay networks, the user accounts may optionally also proceed through one or more authentication procedures, including potentially multifactor authentication procedures, thereby providing another layer of security. The disclosed subject matter may also result in additional benefits relating to data privacy, anonymized communications, and zero trust networks, as discussed in more detail below.

Figure 2:
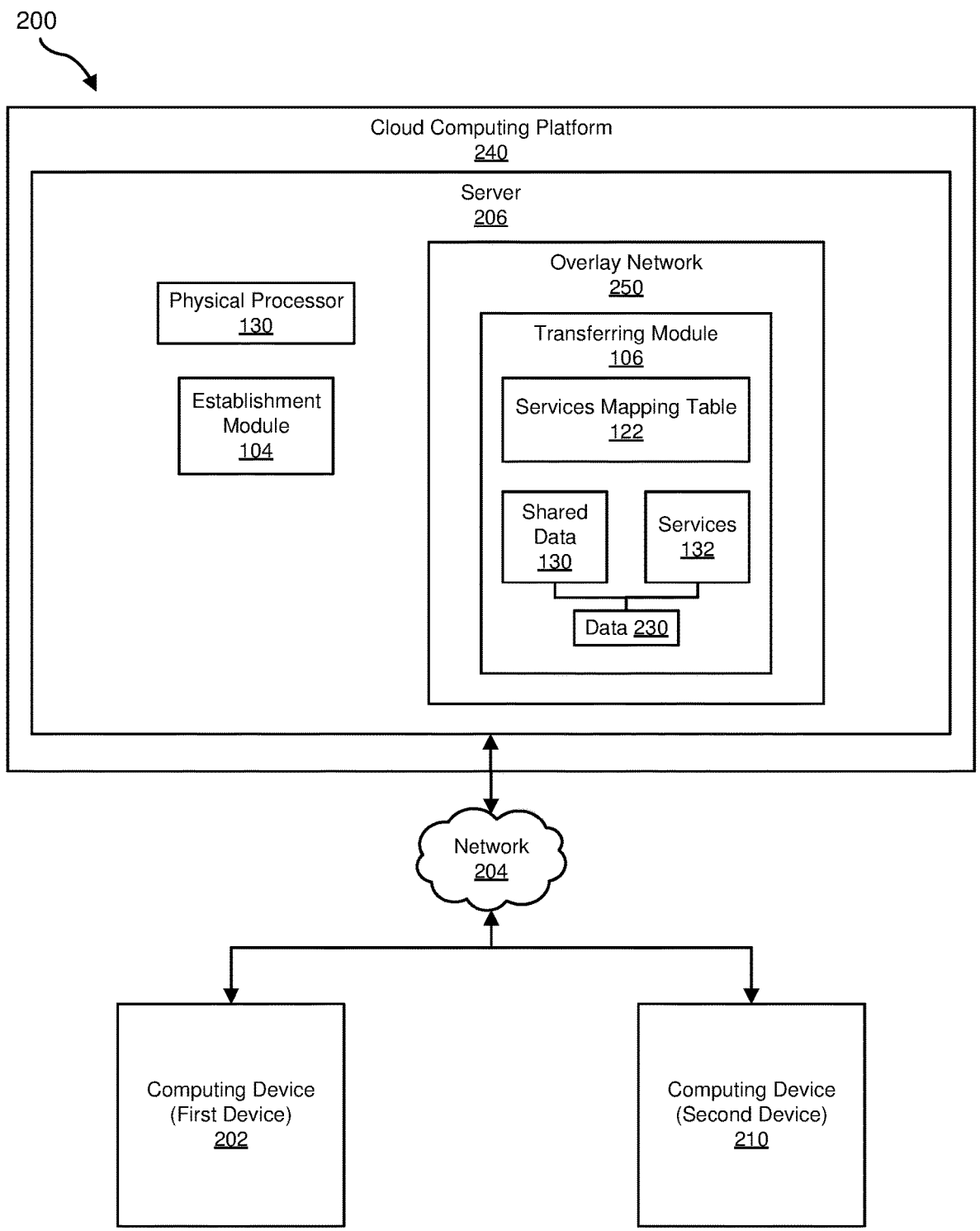
FIG. 2 is a block diagram of an additional example system for securing communications.

The following will provide, with reference to FIGS. 1-2, detailed descriptions of example systems for securing communications. Detailed descriptions of corresponding computer-implemented methods will also be provided in connection with FIGS. 3-10. In addition, detailed descriptions of an example computing system and network architecture capable of implementing one or more of the embodiments described herein will be provided in connection with FIGS. 11 and 12, respectively.

FIG. 1 is a block diagram of example system 100 for securing communications. As illustrated in this figure, example system 100 may include one or more modules 102 for performing one or more tasks. For example, and as will be explained in greater detail below, example system 100 may include an establishment module 104 that establishes an overlay network within a publicly available on-demand cloud computing platform. In these examples, the overlay network may enable secure communications between devices by maintaining within the overlay network a services mapping table 122 that defines access rights 124 to at least one of shared data 130 or services 122. Example system 100 may additionally include a transferring module 106 that transfers data, as part of the overlay network acting as an intermediary, from a first device that has securely connected to the overlay network to a second device that has securely connected to the overlay network, in accordance with access rights 124 defined in services mapping table 122. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate securing communications. Examples of physical processor 130 include, without limitation, microprocessors, microcontrollers, Central Processing Units (CPUs), Field-Programmable Gate Arrays (FPGAs) that implement soft-core processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to secure communications.

For example, and as will be described in greater detail below, establishment module 104 may establish an overlay network 250 within a publicly available on-demand cloud computing platform, such as a cloud computing platform 240, enabling secure communications between devices by maintaining within overlay network 250 services mapping table 122 that defines access rights 124 to share data 130 and/or services 132. Transferring module 106 may transfer data 230, as part of overlay network 250 acting as an intermediary, from a first device, which may correspond to computing device 202, and which has securely connected to overlay network 250, to a second device, such as a computing device 210 (which may optionally parallel computing device 202 in one or more aspects of its hardware/software configuration), and which is also securely connected to overlay network 250, in accordance with access rights 124 defined in services mapping table 122. Moreover, in these examples, data 230 may refer to generic network data that is used to either transfer shared data 130, as discussed further above in connection with FIG. 1, and/or to connect to, or otherwise provide, access to services 132. Accordingly, shared data 130 refers explicitly to the "shared data" of step 302, as discussed further below regarding method 300, whereas data 230 corresponds to the generic "data" of step 304, as is also further discussed below, and which may correspond to data that is transferred to either (i) to transfer shared data 130 and/or (ii) to perform, or connect to, services 132.

Computing device 202 generally represents any type or form of computing device capable of reading computer-executable instructions and/or facilitating the performance of method 300 (e.g., by performing one or more steps carried out by the first device and/or the second device in accordance with method 300). Illustrative examples of computing device 202 generally correspond to personal and/or business endpoint computing devices and/or attached devices connected to a home or local network gateway, including potentially Internet-of-things devices. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-things devices (e.g., smart appliances, etc.), variations or combinations of one or more of the same, and/or any other suitable computing device.

Server 206 generally represents any type or form of computing device that is capable of performing method 300. Illustrative examples of server 206 include one or more network nodes, network components, and/or virtual machines executing within cloud computing platform 240, as discussed in more detail below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
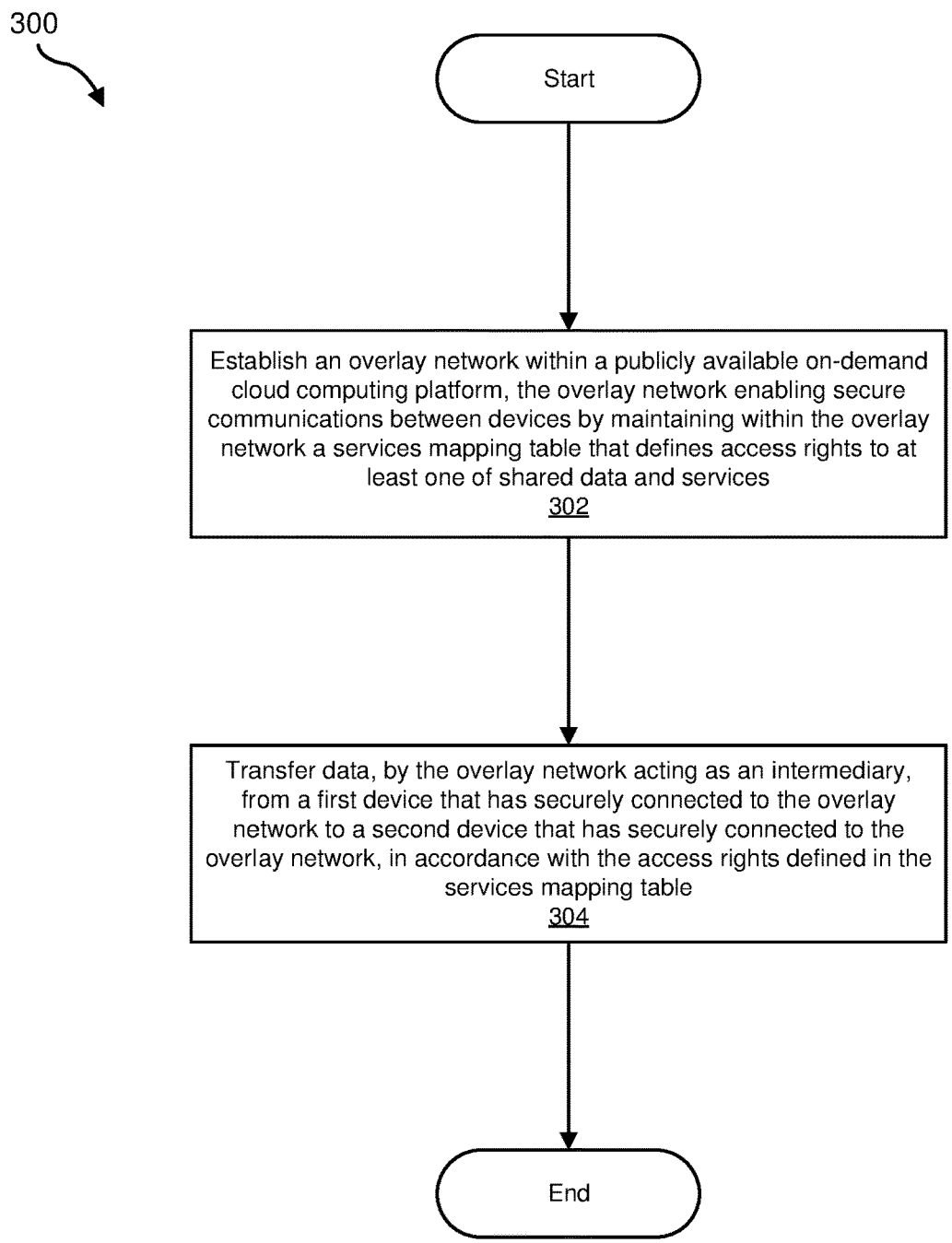
FIG. 3 is a flow diagram of an example method for securing communications.

FIG. 3 is a flow diagram of an example computer-implemented method 300 for securing communications. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may establish an overlay network within a publicly available on-demand cloud computing platform. The overlay network may enable secure communications between devices by maintaining within the overlay network a services mapping table that defines access rights to at least one of shared data or services. For example, establishment module 104 may, as part of server 206 in FIG. 2, establish overlay network 250 within a publicly available on-demand cloud computing platform, such as cloud computing platform 240, and establishment module 104 may enable secure communications between devices by maintaining within overlay network 250 services mapping table 122 that defines access rights 124 to shared data 130 and/or services 132.

Establishment module 104 may establish the overlay network in a variety of ways. In general, establishment module 104 may establish the overlay network within a publicly available on-demand cloud computing platform. Illustrative examples of these cloud computing platforms include AMAZON AWS, MICROSOFT AZURE, GOOGLE CLOUD, ALIBABA CLOUD, and/or TENCENT CLOUD. In some examples, these cloud computing platforms are "public" in the sense that they are generally, substantially, and/or commercially available to the general public. Moreover, these publicly available on-demand cloud computing platforms may simply provide generic virtual machine and/or cloud computation services. Accordingly, these publicly available on-demand cloud computing platforms may not have any predefined network or other configuration for performing specialized security services, including security services for securely communicating between two different parties both connecting to the same cloud computing platform. In other words, these publicly available on-demand cloud computing platforms may have relatively generic, and in many cases interchangeable, virtual machine configurations that are configured to perform generic computation processing as distinct from specialized secure communications processing.

In view of the deficiencies in the general-purpose nature of the publicly available on-demand cloud computing platforms listed above, establishment module 104 may establish an overlay network within a corresponding cloud computing platform. As used herein, the term "overlay network" generally refers to a specialized network configuration or topology on top of the general-purpose cloud computing platform. In particular, the term "overlay network" generally refers to an additional and supplemental configuration of network nodes, network components, and/or general-purpose virtual machines within the cloud computing platform, thereby transforming these virtual machines into specialized virtual machines that may coordinate with one another in the performance of method 300. For example, establishment module 104 may install and/or execute one or more software components within one or more of these virtual machines to facilitate the performance of step 304. Similarly, establishment module 104 may also establish routing tables, configurations, and/or network topologies on top of the general-purpose virtual machines provided by the cloud computing platform, in order to facilitate the performance of step 304, as discussed further below.

In some examples, establishment module 104 and/or transferring module 106 may represent the efforts of a security and/or communication specific third-party vendor or association that is distinct and independent from the cloud computing platform. One illustrative security-focused third-party vendor may include SYMANTEC. Accordingly, the third-party vendor or association may leverage the publicly available on-demand cloud computing platform to repurpose and specialize its general-purpose cloud computing and virtual machine computing resources to thereby perform step 304 and provide its associated benefits, as discussed in more detail below. Moreover, in some scenarios, the third-party vendor or association may perform this customization of the general-purpose cloud computing and virtual machine computing resources without requiring special assistance or private access rights from the cloud computing platform ownership. Instead, the third-party vendor association may perform the relatively limited customization of these resources using access rights that are available to the members of the general public subscribing to access these resources, in an ordinary and conventional manner, through the publicly available subscription interface to the cloud computing platform.

Generally speaking, establishment module 104 may establish the overlay network in order to provide secure communications between two different devices. Moreover, in general terms these two different devices may establish separate secure connections to the overlay network. For example, these two different devices may establish separate and independent secure connections to edge routers and/or corresponding virtual machines within the cloud computing platform, where these edge routers correspond to entry points into the overlay network. In some examples, establishment module 104 may enable the two different devices to establish the secure connections to these entry points into the overlay network by providing one or more user accounts corresponding to these devices with an Internet protocol address, or other suitable network address, to use as a target destination to connect into the overlay network.

Moreover, in some examples, establishment module 104 may maintain one or more instances of these Internet protocol addresses, or other suitable network addresses, in a private or secure condition, as discussed in more detail below. Similarly, in some examples establishment module 104 may provide different user accounts with different Internet protocol addresses. In this manner, although one user account may be aware of one Internet protocol address for one access point, another user account may not be aware of this specific Internet protocol address point, and vice versa, thereby helping to strictly limit the number of individuals to which one or more Internet protocol addresses are exposed outside of the overlay network.

Additionally, or alternatively, establishment module 104 may optionally turn over Internet protocol addresses such that they change dynamically overtime. In some scenarios, establishment module 104 may randomize Internet protocol addresses. In further embodiments, establishment module 104 may only provide ephemeral Internet protocol addresses. In some scenarios, establishment module 104 may switch a target (e.g., static) Internet protocol address for one entry point into the overlay network that was previously provided to a specific user account to a different target (e.g., static) Internet protocol address for a different entry point such that the user account is required to switch entry points. Additionally, or alternatively, establishment module 104 may dynamically change one Internet protocol address that was previously assigned for one specific entry point into the overlay network to a different protocol address for the same entry point. Furthermore, in some examples, one or more user accounts may independently randomize and/or switch the Internet protocol address that the device of the user account uses to connect into the overlay network (e.g., in the case that the user account possesses multiple different Internet protocol address options). Establishment module 104 may use any one or more of the above techniques, in any suitable permutation, to effectively maintain a level of privacy and confidentiality regarding the network address identifiers for entry points into the overlay network. Accordingly, these techniques may help to prevent attackers from identifying these entry points and accessing them themselves or otherwise attempting to breach into the overlay network.

In some examples, both of these two devices may belong to, and/or correspond to, the same user or user account. For example, the same user or user account may possess multiple different devices and nevertheless desire to transmit data from one of these multiple devices to another one of these different devices across a wide area network such as the Internet. As one illustrative example, the same user or user account may possess a home computer attached to a home network within one country at the user's home residence. The same user or user account may also possess a mobile device, such as a smart phone, tablet, and/or laptop, which the user may take outside of this home country on a foreign trip to another country. Nevertheless, the user may desire to remotely transfer data between these two different devices, which are in two different countries, as further outlined above. Accordingly, the user in this scenario may instruct transferring module 106 to perform step 304 using the overlay network, as discussed in more detail below, to successfully achieve this remote file sharing goal. Moreover, the user in this scenario may perform this remote file sharing according to step 304 without the user needing to open one or more service ports on the firewall at the local network gateway of either the user's home residence and/or the corresponding foreign location mentioned above.

Alternatively, in other examples the two devices of step 302 may belong to, or correspond to, two different parties, users, user accounts, organizations, or other individuals, etc. In these additional examples, two different parties may nevertheless transmit files remotely to each other across the wide area network in accordance with step 304, as discussed in more detail below. Moreover, the overall technique corresponding to system 200 may perform step 304 such that one or both of these two different parties maintain a level of anonymity, which is also discussed further below.

In one embodiment, the overlay network may include a zero trust network. In other words, the overlay network may be configured to satisfy a protocol of (i) never by default trusting actors interacting with the overlay network, (ii) always verifying these actors to the extent possible, and/or (iii) hiding resources and services from an actor unless that actor has been explicitly authenticated and the access rights to the available resources and services ascertained. In other words, the zero trust network may be configured according to a protocol of limiting access rights to actors interacting with the overlay network as strictly as possible without compromising the identity and location of the resources and services, and furthermore without compromising intended or desired functionality and access privileges.

Figure 4:
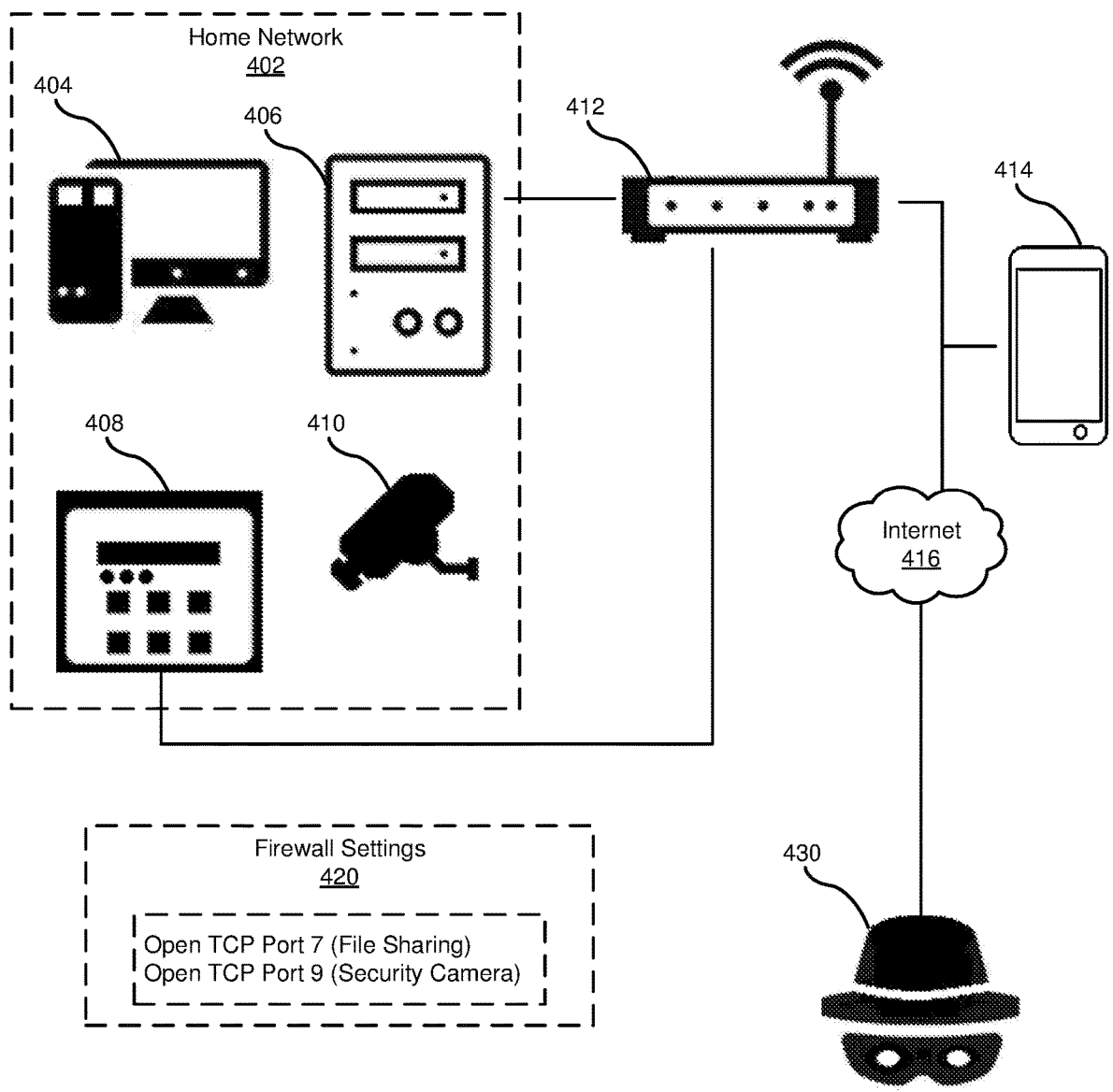
FIG. 4 is a block diagram that illustrates vulnerabilities of related communication systems.
Figure 5:
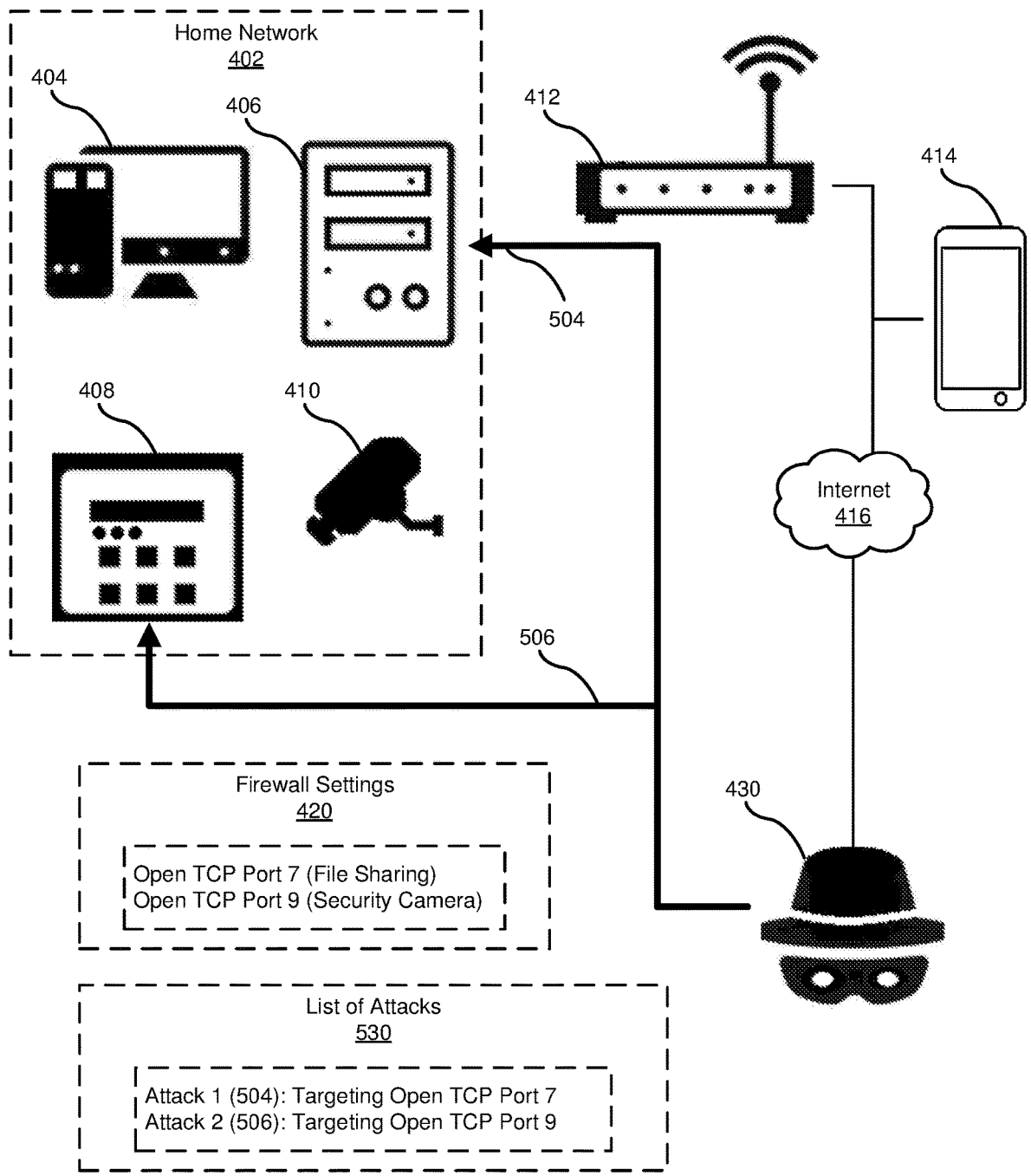
FIG. 5 is another block diagram that further illustrates vulnerabilities of related communication systems.
Figure 6:
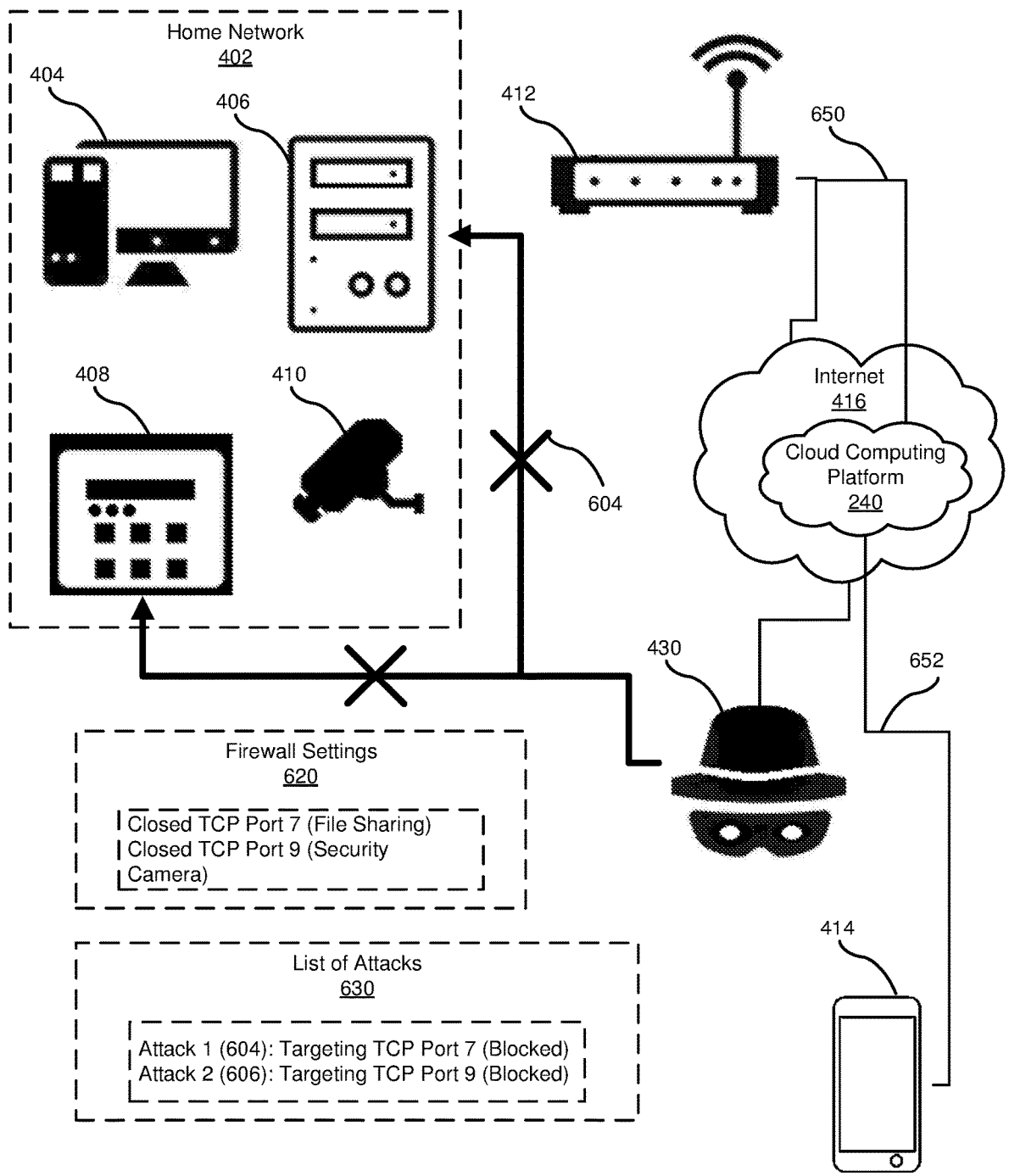
FIG. 6 is a block diagram that illustrates an inventive solution to vulnerabilities illustrated in FIGS. 4 and 5.

FIGS. 4-6 show block diagrams in series that helps illustrate problems of related systems for transferring data to share data or provide services and how the inventive solution of method 300 solves these problems and improves upon these systems. Beginning with FIG. 4, this figure shows that the home network 402 may connect multiple different devices to the corresponding local network gateway 412. These devices may include a desktop computer 404, a local file server 406, a security camera control panel 408, and a corresponding security camera 410. In some examples, desktop computer 404 may have a local connection to local file server 406, and similarly security camera control panel 408 may have a local connection to security camera 410, thereby further enabling security camera control panel 408 to provide control over security camera 410.

As further illustrated in FIG. 4, local network gateway 412 may include its own firewall for monitoring network traffic at the point of local network gateway 412 and thereby providing a layer of protection for the attached devices within home network 402 from threats originating outside of home network 402. These threats may include threats originating from an attacker 430 over a wide area network, such as Internet 416. This figure also further shows that the firewall of local network gateway 412 may include a configuration of firewall settings, as shown in firewall settings 420. Moreover, in these examples, a user or administrator corresponding to home network 402 may also desire to transmit one or more items of data between home network 402 and a remote device outside of home network 402, such as a smart phone 414, which may also belong to the same user, as further discussed above. Furthermore, in these examples, a user or administrator corresponding to home network 402 may also desire to allow the security camera to be viewable by a remote device outside of home network 402, such as smart phone 414, which may also belong to the same user, as further discussed above. Accordingly, in these examples, the same user may thereby open one or more ports within firewall settings 420 to thereby enable standardized file transfer, or enable security camera viewing service, between smart phone 414 and one or more attached devices connected to home network 402 through the access point of local network gateway 412. For example, opening one or more ports within firewall settings 420 may enable the user to share files from local file server 406 with smart phone 414. Similarly, opening one or more ports within firewall settings 420 may enable the user to transmit data between smart phone 414 and security camera control panel 408, thereby further enabling the user to remotely control security camera 410 (or view content captured by security camera 410) using smart phone 414. In the specific example of FIG. 4, the user has opened TCP port 7 to enable file sharing through local file server 406, and the user has further opened TCP port 9 to perform remote controlling or remote viewing of security camera 410.

Although the arrangement of related systems, as shown in FIG. 4, provides the benefits of enabling appropriate communication between smart phone 414 and one or more attached devices connected to local network gateway 412, as outlined above, this arrangement also creates one or more security risks. FIG. 5 helps to illustrate these potential security risks. FIG. 5 shows a somewhat modified version of the same workflow diagram corresponding to FIG. 4. In comparison to FIG. 4, FIG. 5 further illustrates how the opening of one or more ports within firewall settings 420 has further enabled attacker 430 to launch corresponding attacks, including an attack 504 targeting TCP port 7 and local file server 406, as well as an attack 506 targeting TCP port 9 and security camera control panel 408.

Returning to FIG. 3 and method 300, at step 304, one or more of the systems described herein may transfer data, as part of the overlay network acting as an intermediary, from a first device that has securely connected to the overlay network to a second device that has securely connected to the overlay network, in accordance with the access rights defined in the services mapping table. For example, transferring module 106 may transfer data, as part of overlay network 250 acting as an intermediary, from computing device 202 that has securely connected to overlay network 250 to computing device 210 that has securely connected to overlay network 250, in accordance with access rights 124 defined in services mapping table 122.

To help address the potential security risks outlined above in connection with FIGS. 4-5, establishment module 104 may establish overlay network 250 within a cloud computing platform 240, as discussed above regarding step 302, and furthermore transferring module 106 may perform step 304 to transfer data 230 between computing device 202 and computing device 210. Accordingly, FIG. 6 helps to show how transferring module 106 may perform step 304 to help address the risks associated with the arrangement of FIGS. 4-5. FIG. 6 provides another block diagram that constitutes another revision of the scenario shown in FIGS. 4-5, where this additional revision corresponds to method 300 and further addresses the security risks associated with FIGS. 4-5. In comparison to the arrangement of FIGS. 4-5, the inventive solution shown in FIG. 6 involves the user establishing secure communications between one or more attached devices within home network 402, on the one hand, and a remote device outside of home network 402, such as smart phone 414. Whereas the arrangement of FIGS. 4-5 involved the user opening one or more ports within firewall settings 420, as further discussed above, the arrangement of FIG. 6 involves the user instead maintaining the closure of these ports, thereby reducing the attack surface associated with local network gateway 412. More generally, the overlay network effectively reduces port exposure at a local network gateway through which the first device connects to the overlay network by enabling a user corresponding to the first device to close a service port of a firewall at the local network gateway and, instead of transferring the data across the service port, transferring the data using the overlay network as an intermediary.

In the arrangement of FIG. 6, the user has substituted, in the place of opening the ports listed in firewall settings 420, the establishment of a secure connection 650 between local network gateway 412 and cloud computing platform 240. Firewall settings 620 corresponds to an updated version of firewall settings 420 due to the fact that in firewall settings 620 the corresponding firewall ports have been maintained as closed rather than open. Similarly, the user has also established a secure connection 652 between a remote device, such as smart phone 414, and overlay network 250 within cloud computing platform 240. Secure connection 650 and secure connection 652 may be established using any suitable encryption and/or secure communication protocol, including one or more of (i) the INTERNET PROTOCOL SECURITY (IPSEC) protocol, (ii) the TRANSPORT LAYER SECURITY protocol, (iii) the SECURE SOCKETS LAYER protocol, (iv) the SECURE SHELL protocol, and/or (v) a public key infrastructure. In one embodiment, the establishment of secure connection 650 and secure connection 652, as distinct from the opening of ports within firewall settings 420 (i.e., in the scenario of FIGS. 4-5), thereby reduces the attack surface associated with this firewall and local network gateway 412. Accordingly, the inventive solution shown in FIG. 6 prevents attacker 430 from executing one or more attacks, such as those shown in list of attacks 630. List of attacks 630 updates list of attacks 530 from FIG. 5 due to the fact that the corresponding attacks have been blocked. For example, a blocking action 604 provides a graphic illustration of the attack vector associated with local file server 406 that has been blocked in the arrangement of FIG. 6. Similarly, the attack vector associated with security camera control panel 408 has been blocked in a parallel manner. In the arrangement of FIG. 6, instead of transferring files using the open firewall ports associated with FIGS. 4-5, the user instead transfers files or other data between devices connected to home network 402 and a remote device, such as smart phone 414, using overlay network 250 within cloud computing platform 240 as an intermediary or proxy, and as further discussed below.

Figure 7:
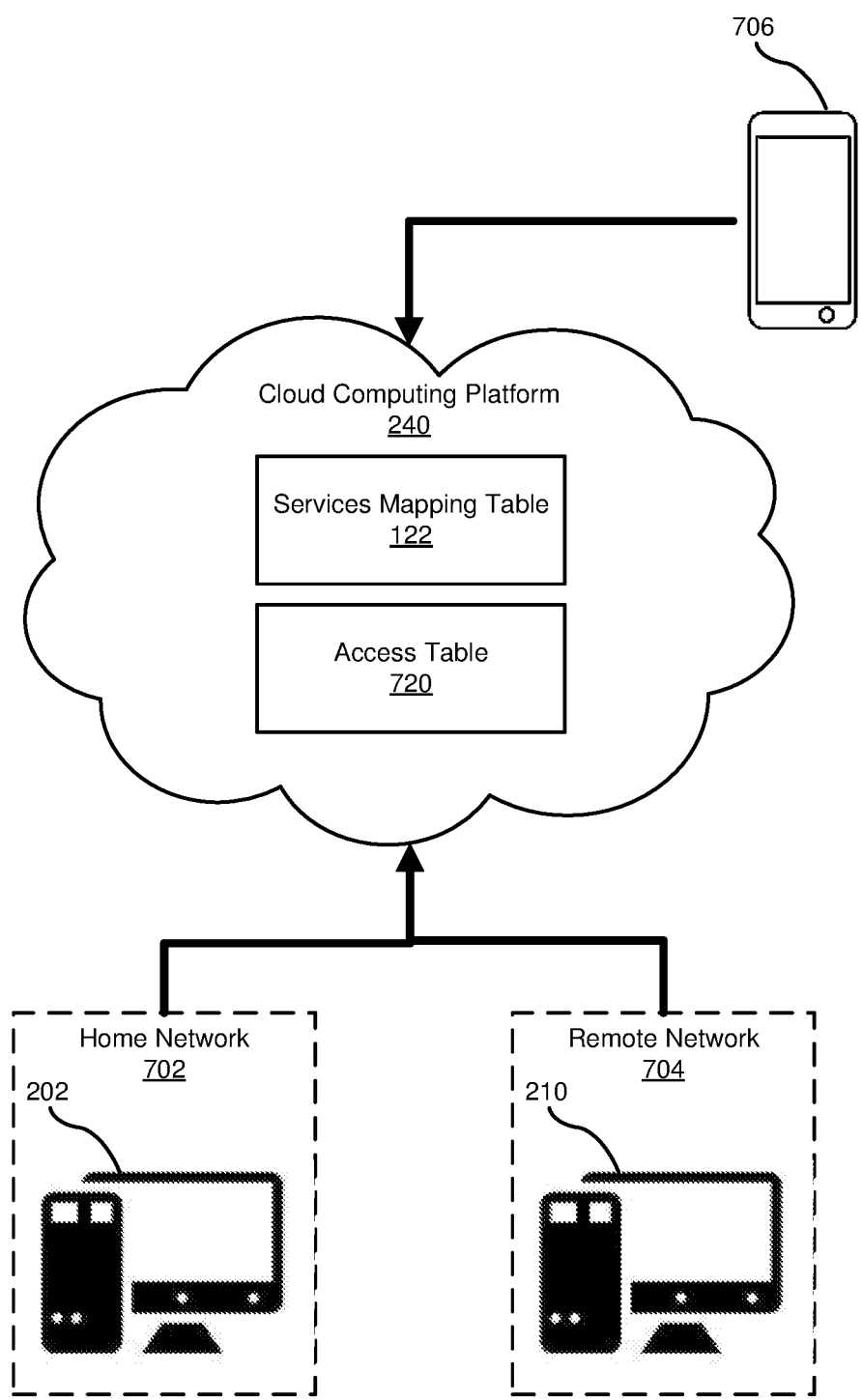
FIG. 7 is a block diagram that illustrates a workflow corresponding to the method for securing communications.

In one embodiment, the overlay network enables secure communications between devices by further maintaining within overlay network 250 services mapping table 122 and/or an access table 720, which are further illustrated in FIGS. 7-8. More specifically, FIG. 7 provides a higher level general overview of how transferring module 106, as part of overlay network 250 within cloud computing platform 240, may reference one or both of services mapping table 122 and/or access table 720 to transfer data 230 between computing device 202, which may be associated with one home network 702, and computing device 210, which may be associated with a remote network 704, as further discussed above. Moreover, this figure also further illustrates how a smart phone 706 may also further interact with cloud computing platform 240 in a manner that parallels the interactions regarding smart phone 414 discussed above in connection with FIGS. 4-6.

Generally speaking, transferring module 106 may enable secure communications between devices at least in part by only permitting communications or data transfer between devices when such communications are allowed or permitted according to the specific permissions set in the services mapping table. For example, in some scenarios the services mapping table may define all positive access rights for transferring data between one device and another device such that any candidate data transfer that does not conform to one or more access rights set forth in a record in the services mapping table is simply not permitted. Additionally, or alternatively, in some other scenarios the services mapping table may also include records that specify one or more instances of explicit denials of access rights.

Additionally, FIG. 8 provides a more concrete and detailed illustration of examples of services mapping table 122 and access table 720. Although the figures of this application illustrate services mapping table 122 and access table 720 as separate and distinct, this is merely optional and in other examples one of the tables may incorporate the other and/or they may otherwise overlap or interrelate. More specifically, services mapping table 122 in FIG. 8 shows how this table may specify how one user account interacting with overlay network 250 in accordance with method 300 may designate one or more access rights, corresponding to access rights 124, in connection to one or more receiving user accounts. In particular, the columns of services mapping table 122 illustrate how each record for a particular instance of granting an access right may specify (i) the granting user name, (ii) the service type, (iii) the corresponding resource or resources, (iv) the receiving user name, and (v) the corresponding access rights, such as read access rights, write access rights, and/or read/write access rights, as well as the right to "set," toggle, and/or control one or more resources, such as an appliance and/or Internet-of-things device (e.g., a remote controlled or remotely viewed thermostat, camera, and/or door). More generally speaking, as used herein, the term "services mapping table" generally records at least specifics indicating (i) a particular access right for a particular resource or service and (ii) the particular entity to which this access right is granted. In general, only granting users who possess control over, ownership over, and/or administrator privileges over one or more resources and/or services may thereby grant corresponding access rights to one or more other entities interacting with overlay network 250. Consistent with this understanding, services mapping table 122 may include any suitable combination or permutation of the items of information shown in the example of the table in FIG. 8.

Additionally, FIG. 8 also illustrates a concrete and detailed example of access table 720. In this specific example, access table 720 may specify for each instance of a user account connecting to overlay network 250, one or more items of information including: (i) the user name, (ii) one or more corresponding service ports used to provide access to shared resources and services, (iii) the current target Internet protocol address within a cloud computing platform 250 (e.g., AMAZON AWS) to which this user account specifically connects, (iv) an indication of whether this user account is currently actively connected or not, and/or (v) an indication of a notification mechanism for communicating one or more notifications to this user account (e.g., an indication of a preference of the user account in terms of a notification mechanism for notifying the user account when another user account belonging to the same user account group becomes active and/or when a service of interest to another user account becomes active.

Figure 9:
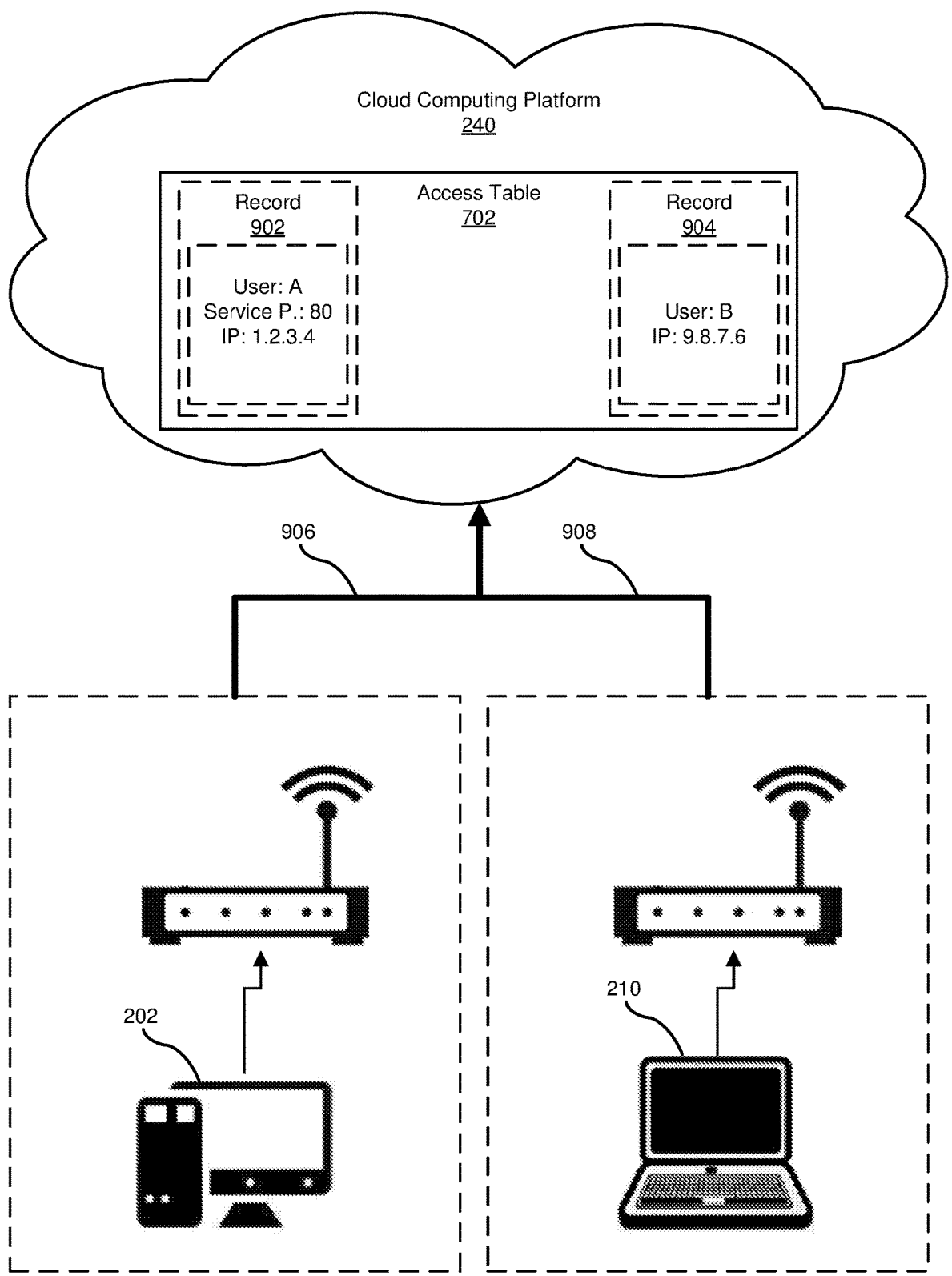
FIG. 9 is another block diagram that illustrates a workflow corresponding to the method for securing communications.

In addition to FIG. 8, FIG. 9 also provides another illustrative example of access table 720, including (i) a record 902 that specifies actual and potentially confidential network address information through which the first device connects to the overlay network and/or the confidential network service port on which shared resources or services are accessed by other user accounts that are connected to the overlay network, as well as (ii) also another record 904 that specifies actual and potentially confidential network service port and/or network address information through which the second device connects to the overlay network. Accordingly, transferring module 106 may leverage record 902 and/or record 904, such as by performing one or more translation operations (e.g., translating a randomized and/or anonymized identifier, or other identifier, such as "@4576832" into a corresponding actual service port and/or network address to reach the associated user or user account. In the example of FIG. 9, transferring module 106 may thereby successfully transmit data 230 at step 304, according to which data 230 may be transmitted from computing device 202 to computing device 210 (e.g., using a secure connection 906 and a secure connection 908 to overlay network 250 within cloud computing platform 240, as further discussed above in connection with FIG. 6).

In further examples, the information within access table 720 can change dynamically and constantly. For example, to maximize anonymizing effect, user account A may connect to overlay network 250 at Internet protocol address 1.2.3.4 for 3 hours, then connect to a different Internet protocol address 5.6.7.8 for 5 hours. In these examples, establishment module 104 may understand each time when an authorized user account is connected to overlay network 250. Accordingly, establishment module 104 may appropriately update access table 720 with the latest connection information for one or more user accounts.

Referring back the service ports shown in access table 720 of FIG. 8, although the service ports are open on the devices inside the home network, these service ports are potentially invisible outside the home network. At the same time, external devices or users can access these service ports from the Internet. The outside user who wants to access one of such services does not know the actual public Internet protocol address of the home router, nor the actual service port (TCP or UDP) that is open on the home device. Instead, overlay network 250 may increase security, privacy, and/or anonymizing by keeping one or more of these items of information private within overlay network 250 (e.g., within access table 720). In other words, in some scenarios the only entities who may possess confidential information regarding the network service port and/or network address that a specific user account is using to connect to overlay network 250 may be the following: (i) overlay network 250 itself, which may optionally store this information within access table 720, and (ii) the user account itself (e.g., the granting user account). In contrast, any one or more receiving user accounts may not be exposed to this confidential information, thereby improving privacy, security, and/or anonymity. Accordingly, transferring module 106 may optionally use one or more items of port and/or network address information, as discussed above, to effectively translate identifiers for user accounts (e.g., which may be randomized and/or anonymized) into actual final port and/or network address information for finalizing the transfer of data at step 304.

In one embodiment, the overlay network permits the user account to publish at least one of (i) protected data that the user account can make available to another user account and/or (ii) a service that the user account can make available to the other user account. For example, the protected data may correspond to protected data included within the "directory" and/or "file X" listed within services mapping table 122 and shown in FIG. 8. Similarly, a service that the user can make available to another user account may include one or more instances of remote device control (e.g., remote control of a thermostat, a camera, and/or a door) that are further listed in services mapping table 122 and shown in FIG. 8, and further discussed above. In some examples, transferring module 106 may enable the granting user account to specify a set of additional user accounts that are granted visibility rights to see the publication of the availability of one or more of these resources, without necessarily being granted one or more access rights to these resources. For example, the granting user account may specify that one or more of these resources are listed publicly and/or globally across overlay network 250. In other examples, the granting user account may limit publication and/or visibility of one or more of these resources to a strictly defined set of additional user accounts. Of course, the granting user account may specify which user accounts can see publication of availability of one or more resources independently of further specifying access rights to these resources, although typically receiving users who receive access rights to one or more resources will also have been granted visibility to these resources.

Moreover, in some examples the overlay network permits the user account to publish at least one of the protected data and the service in a location independent manner such that publishing occurs regardless of a current location of a user corresponding to the user account. In these examples, the user account may simply establish a secure connection, such as secure connection 652 shown in FIG. 6, from any arbitrary remote location around the world with accessibility to the Internet, and thereby publish one or more instances of available resources, as further discussed above.

Additionally, or alternatively, in further examples the overlay network enables multiple devices to access at least one of the protected data and the service such that N-to-N communications are permitted as distinct from being limited to either 1-to-1 or 1-to-N communications. Returning to the example of FIG. 8, services mapping table 122 further specifies that both user name B and user name C have been granted access by user name A to the specific resource "directory." Accordingly, in these examples, the corresponding user accounts for user name B and user name C may simultaneously access this specific resource. Moreover, in additional examples, multiple granting user accounts may pool together one or more resources while also granting access rights to multiple receiving user accounts, thereby achieving N-to-N or many-to-many communications as distinct from being limited to 1-to-1 or 1-to-N communications.

Additionally, or alternatively, in some examples transferring module 106 may transfer data at step 304 in a manner that maintains a level of anonymity for one user account from the perspective of at least one other user account or other counterparty. For example, to achieve this level of anonymity, transferring module 106 may optionally use a randomized and/or anonymized identifier for one user account, which another user account or other counterparty may reference in order to identify that specific anonymized user account, without necessarily exposing or revealing the true identity of the user account (e.g., the granting user account). One illustrative example of such a randomized and/or anonymized identifier may include "@4576832," which may optionally be appended or prepended to a user-chosen readable string. Of course, in additional or alternative examples the receiving user account, as distinct from the granting user account, may also be anonymized in a parallel manner.

Figure 10:
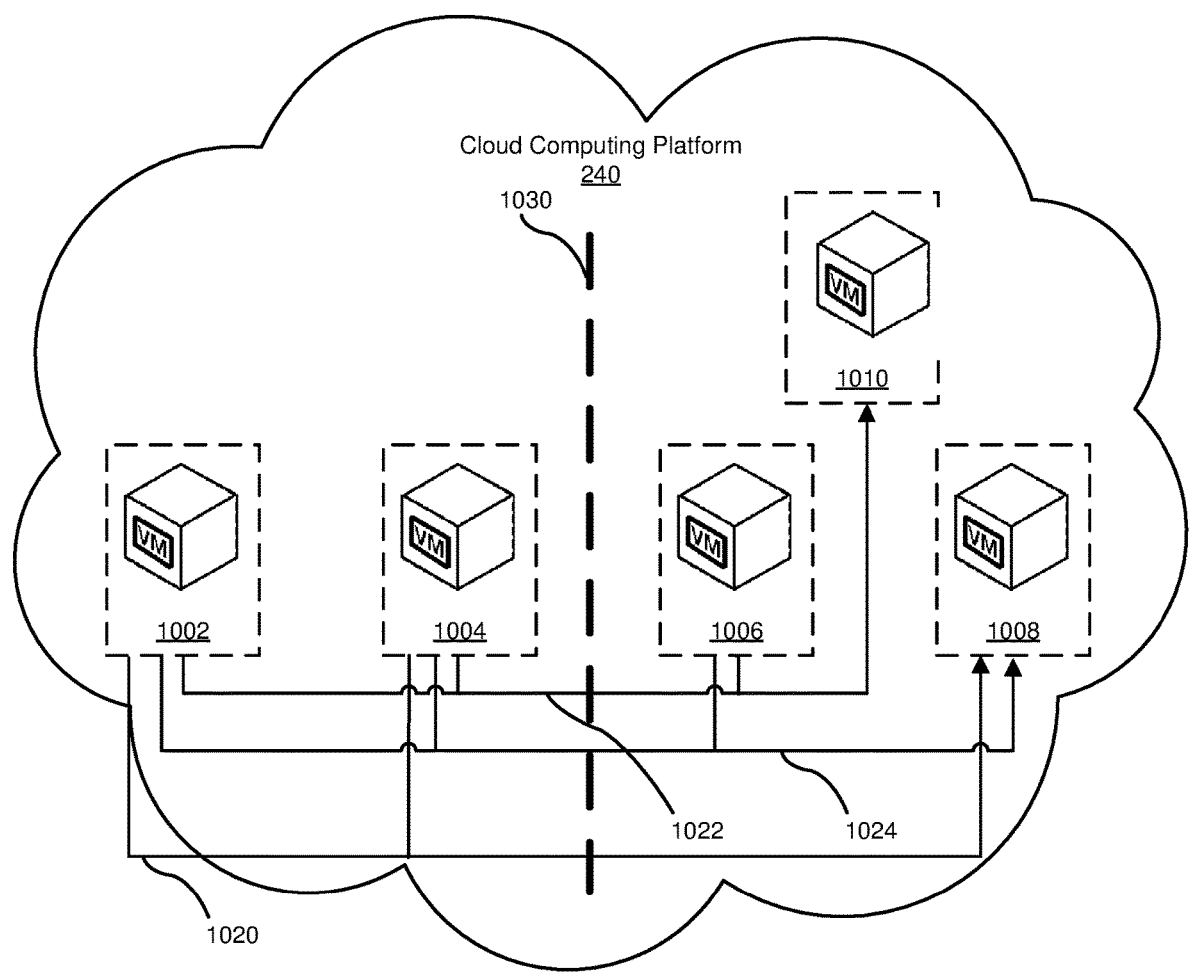
FIG. 10 is a block diagram that illustrates dynamic communication path evolution corresponding to one embodiment of the method for securing communications.

Lastly, FIG. 10 shows an example of how establishment module 104 may optionally and dynamically change the network path through one or more network nodes, network components, and/or virtual machines within a cloud computing platform 240 in the performance of method 300. This figure further illustrates how a multitude of different virtual machines, including a virtual machine 1002, a virtual machine 1004, a virtual machine 1006, a virtual machine 1008, and a virtual machine 1010, may all be part of overlay network 250 within cloud computing platform 240. These virtual machines may effectively form at least part of a network topology for the overlay network. Moreover, in some instances, these virtual machines may process one or more items of data, or network packets, sequentially such that the items of data pass from one virtual machine to another, and so on, in a specific sequence, etc. As further discussed below, in some scenarios it is desirable, and potentially even mandatory, for establishment module 104 to ensure full bidirectional control of the sequence of the network path for corresponding network communications.

In this illustrative example, the virtual machines on the right half of a dashed line 1030 may have been added in real-time. For example, originally a corresponding network path may have proceeded from virtual machine 1002, to virtual machine 1004, and to virtual machine 1008, in a sequence corresponding to arrow 1020. In this original scenario, the path between these three virtual machines would have been fully controlled by establishment module 104. Subsequently, virtual machine 1006 and virtual machine 1010 may have been added by establishment module 104. Responsive to this dynamic change, establishment module 104 may now establish two different and dynamically updated network paths, (i) a first path corresponding to virtual machine 1002, virtual machine 1004, virtual machine 1006, and virtual machine 1008, in a sequence corresponding to arrow 1024 and (ii) a second path corresponding to virtual machine 1002, virtual machine 1004, virtual machine 1006, and virtual machine 1010, in a sequence corresponding to arrow 1022. In this additional example, even though these updated network paths are newly built, establishment module 104 still fully controls bidirectional flow paths for these updated network paths corresponding to arrow 1024 and arrow 1022 in FIG. 10.

Figure 11:
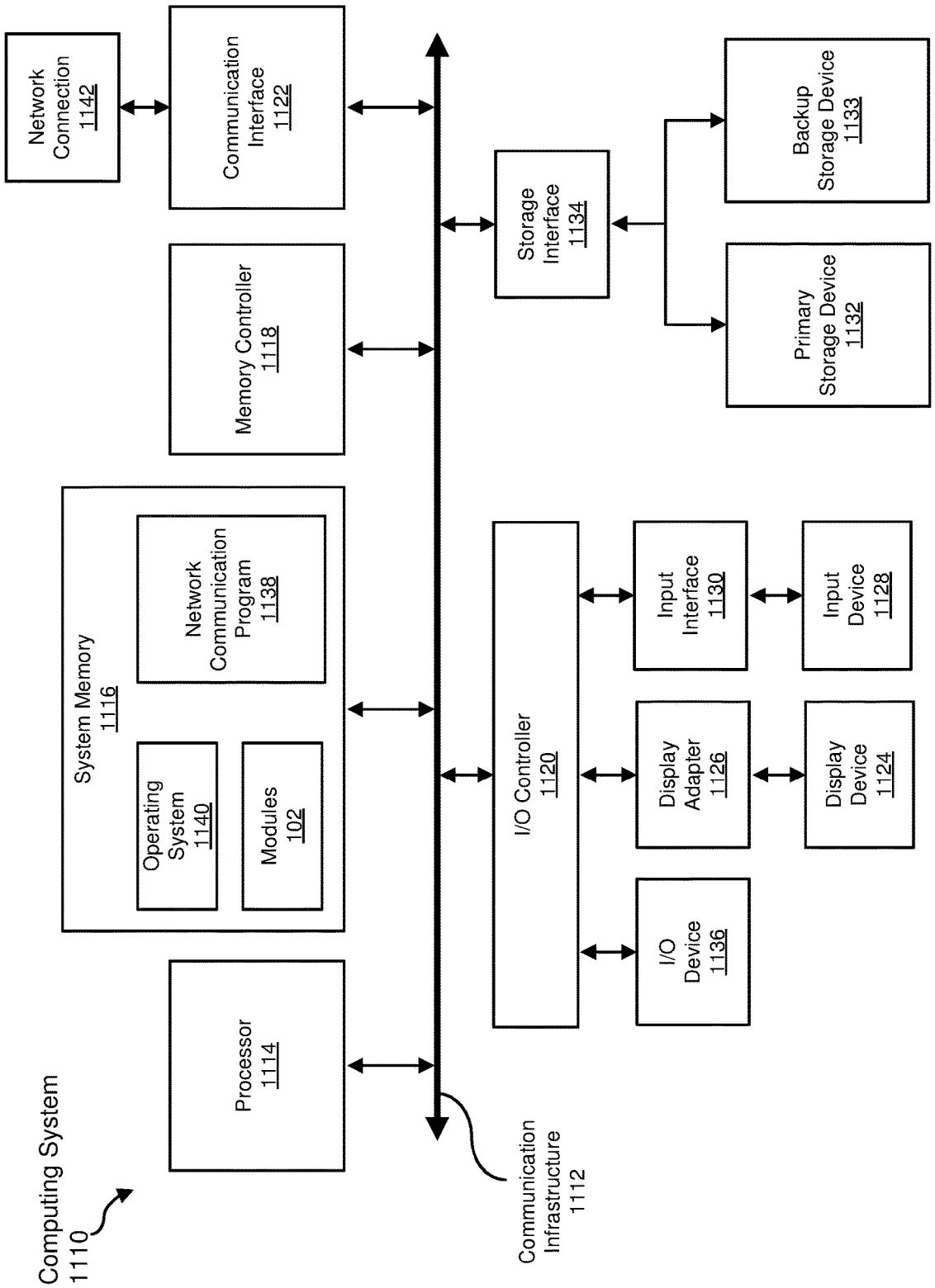
FIG. 11 is a block diagram of an example computing system capable of implementing one or more of the embodiments described and/or illustrated herein.

FIG. 11 is a block diagram of an example computing system 1110 capable of implementing one or more of the embodiments described and/or illustrated herein. For example, all or a portion of computing system 1110 may perform and/or be a means for performing, either alone or in combination with other elements, one or more of the steps described herein (such as one or more of the steps illustrated in FIG. 3). All or a portion of computing system 1110 may also perform and/or be a means for performing any other steps, methods, or processes described and/or illustrated herein.

Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the example embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, one or more of modules 102 from FIG. 1 may be loaded into system memory 1116.

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110. Examples of operating system 1140 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, example computing system 1110 may also include at least one input device 1128 coupled to I/O controller 1120 via an input interface 1130. Input device 1128 generally represents any type or form of input device capable of providing input, either computer or human generated, to example computing system 1110. Examples of input device 1128 include, without limitation, a keyboard, a pointing device, a speech recognition device, variations or combinations of one or more of the same, and/or any other input device.

Additionally or alternatively, example computing system 1110 may include additional I/O devices. For example, example computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between example computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or Application Specific Integrated Circuit (ASIC) incorporated in communication interface 1122.

As illustrated in FIG. 11, example computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 1110 may be configured as an Application Specific Integrated Circuit (ASIC) adapted to implement one or more of the example embodiments disclosed herein.

Figure 12:
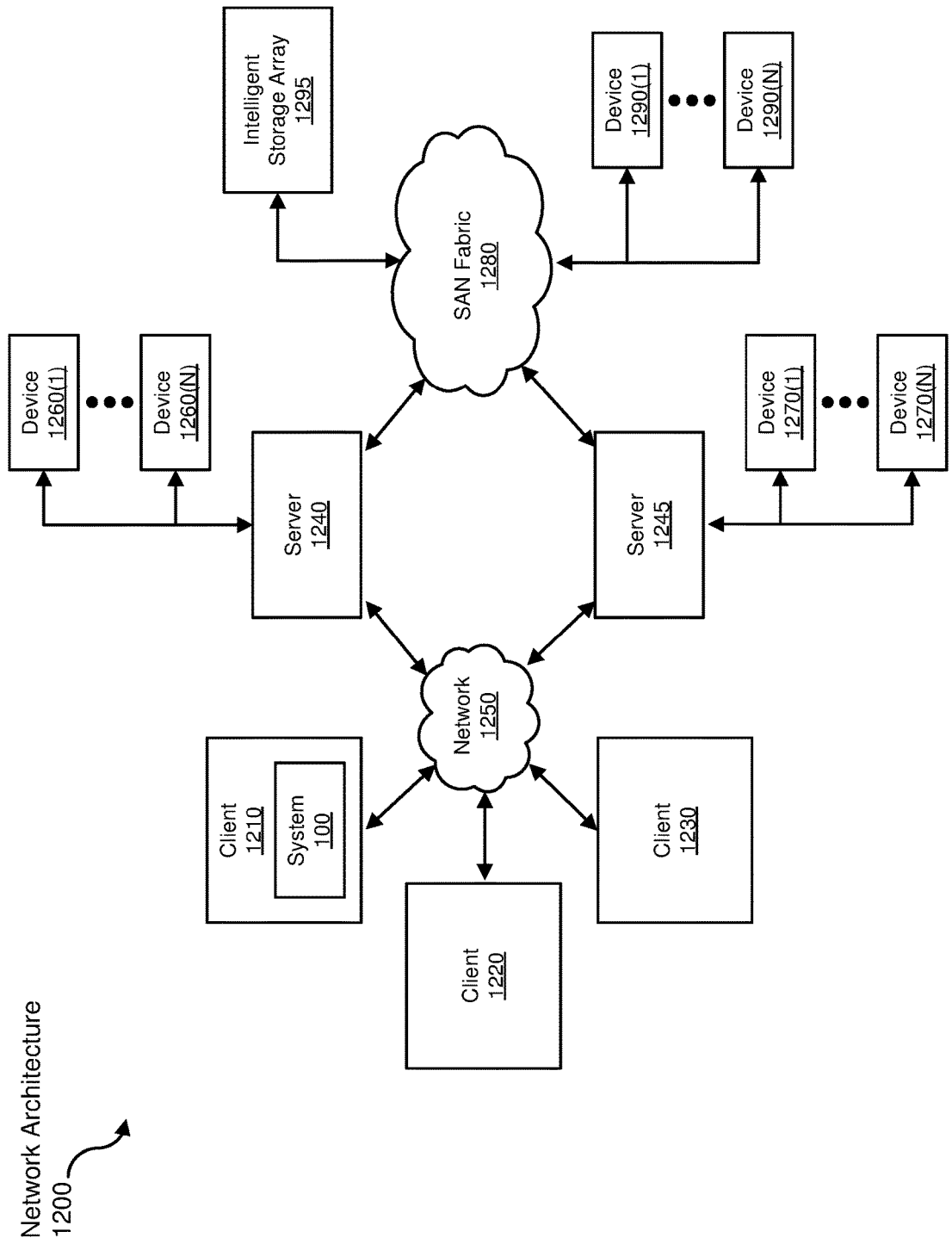
FIG. 12 is a block diagram of an example computing network capable of implementing one or more of the embodiments described and/or illustrated herein.

FIG. 12 is a block diagram of an example network architecture 1200 in which client systems 1210, 1220, and 1230 and servers 1240 and 1245 may be coupled to a network 1250. As detailed above, all or a portion of network architecture 1200 may perform and/or be a means for performing, either alone or in combination with other elements, one or more of the steps disclosed herein (such as one or more of the steps illustrated in FIG. 3). All or a portion of network architecture 1200 may also be used to perform and/or be a means for performing other steps and features set forth in the instant disclosure.

Client systems 1210, 1220, and 1230 generally represent any type or form of computing device or system, such as example computing system 1110 in FIG. 11. Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the Internet. In one example, client systems 1210, 1220, and/or 1230 and/or servers 1240 and/or 1245 may include all or a portion of system 100 from FIG. 1.

As illustrated in FIG. 12, one or more storage devices 1260(1)-(N) may be directly attached to server 1240. Similarly, one or more storage devices 1270($i$)-(N) may be directly attached to server 1245. Storage devices 1260($i$)-(N) and storage devices 1270($i$)-(N) generally represent any type or form of storage device or medium capable of storing data and/or other computer-readable instructions. In certain embodiments, storage devices 1260($i$)-(N) and storage devices 1270($i$)-(N) may represent Network-Attached Storage (NAS) devices configured to communicate with servers 1240 and 1245 using various protocols, such as Network File System (NFS), Server Message Block (SMB), or Common Internet File System (CIFS).

Servers 1240 and 1245 may also be connected to a Storage Area Network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290($i$)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290($i$)-(N)

and array 1295 appear as locally attached devices to client systems 1210, 1220, and 1230. As with storage devices 1260(1)-(N) and storage devices 1270(i)-(N), storage devices 1290(i)-(N) and intelligent storage array 1295 generally represent any type or form of storage device or medium capable of storing data and/or other computer-readable instructions.

In certain embodiments, and with reference to example computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(i)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1240, server 1245, storage devices 1260(i)-(N), storage devices 1270(i)-(N), storage devices 1290(i)-(N), intelligent storage array 1295, or any combination thereof. All or a portion of one or more of the example embodiments disclosed herein may also be encoded as a computer program, stored in server 1240, run by server 1245, and distributed to client systems 1210, 1220, and 1230 over network 1250.

As detailed above, computing system 1110 and/or one or more components of network architecture 1200 may perform and/or be a means for performing, either alone or in combination with other elements, one or more steps of an example method for securing communications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for securing communications, at least a portion of the method being performed by a computing device comprising at least one processor, the method comprising:
   establishing an overlay network within a publicly available on-demand cloud computing platform, the overlay network enabling secure communications between devices by maintaining within the overlay network a services mapping table that defines access rights to at least one of shared data or services; and
   transferring data, by the overlay network acting as an intermediary, from a first device that has securely connected to the overlay network to a second device that has securely connected to the overlay network, in accordance with the access rights defined in the services mapping table;
   wherein:
   the overlay network enables secure communications between devices by further maintaining within the overlay network an access table that maintains a record in part of which target Internet protocol address of the publicly available on-demand cloud computing platform the first device used to connect to the overlay network;
   the target Internet protocol address is ephemeral; and
   a translation operation is performed to translate an identifier into a corresponding service port or network address to transfer the data.

2. The computer-implemented method of claim 1, wherein the overlay network comprises a zero trust network.

3. The computer-implemented method of claim 1, wherein the access table further defines which services a connected user provides to other users.

4. The computer-implemented method of claim 1, wherein the access table further defines which data a connected user provides to other users.

5. The computer-implemented method of claim 1, wherein the access table further defines at least one of:
   an indication that a connected user is actively connected;
   an indication of how the connected user prefers to be notified when other users belonging to a same user group become active;
   an indication of when at least one service corresponding to another user becomes active; or
   an indication of when at least one shared data item corresponding to another user becomes active.

6. The computer-implemented method of claim 1, wherein the overlay network permits a user account to publish at least one of:
   protected data that the user account can make available to another user account; or
   a service that the user account can make available to the another user account.

7. The computer-implemented method of claim 6, wherein the overlay network permits the user account to publish at least one of the protected data and the service in a location independent manner such that publishing occurs regardless of a current location of a user corresponding to the user account.

8. The computer-implemented method of claim 6, wherein the overlay network enables multiple devices to access at least one of the protected data and the service such that N-to-N communications are permitted as distinct from being limited to either 1-to-1 or 1-to-N communications.

9. The computer-implemented method of claim 1, wherein:
   transferring data, by the overlay network acting as the intermediary, further includes transferring data from a first party corresponding to the first device to a second party corresponding to the second device; and
   at least one of the first party and the second party is anonymous from a perspective of the other party.

10. The computer-implemented method of claim 9, wherein at least one of the first party and the second party is anonymous from the perspective of the other party such that the anonymous party uses an anonymized user account identifier.

11. The computer-implemented method of claim 1, wherein the overlay network effectively reduces port exposure at a local network gateway through which the first device connects to the overlay network by enabling a user corresponding to the first device to close a service port of a firewall at the local network gateway and, instead of transferring the data across the service port, transferring the data using the overlay network as the intermediary.

12. The computer-implemented method of claim 1, wherein transferring the data is performed without data caching inside the overlay network such that the data passes from the first device to the second device in a pass-through manner with respect to the overlay network.

13. The computer-implemented method of claim 1, wherein the first device and the second device securely connect to the overlay network using network communications conforming to at least one of:
   the INTERNET PROTOCOL SECURITY (IPSEC) protocol;
   the TRANSPORT LAYER SECURITY protocol;
   the SECURE SOCKETS LAYER protocol;
   the SECURE SHELL protocol; or
   a public key infrastructure.

14. A system for securing communications, the system comprising:
   an establishment module, stored in memory, that establishes an overlay network within a publicly available on-demand cloud computing platform, the overlay network enabling secure communications between devices by maintaining within the overlay network a services mapping table that defines access rights to at least one of shared data or services;
   a transferring module, stored in memory, that transfers data, as part of the overlay network acting as an intermediary, from a first device that has securely connected to the overlay network to a second device that has securely connected to the overlay network, in accordance with the access rights defined in the services mapping table; and
   at least one physical processor configured to execute the establishment module and the transferring module;
   wherein:
   the overlay network enables secure communications between devices by further maintaining within the overlay network an access table that maintains a record in part of which target Internet protocol address of the publicly available on-demand cloud computing platform the first device used to connect to the overlay network;
   the target Internet protocol address is ephemeral; and
   the transferring module is configured to perform a translation operation to translate an identifier into a corresponding service port or network address to transfer the data.

15. The system of claim 14, wherein the overlay network comprises a zero trust network.

16. The system of claim 14, wherein the access table further defines which services a connected user provides to other users.

17. The system of claim 14, wherein the access table further defines which data a connected user provides to other users.

18. The system of claim 16, wherein the access table further defines at least one of:
   an indication that a connected user is actively connected;
   an indication of how the connected user prefers to be notified when other users belonging to a same user group become active;
   an indication of when at least one service corresponding to another user becomes active; or
   an indication of when at least one shared data item corresponding to another user becomes active.

19. The system of claim 14, wherein the first device and the second device securely connect to the overlay network using network communications conforming to at least one of:
   the INTERNET PROTOCOL SECURITY (IPSEC) protocol;
   the TRANSPORT LAYER SECURITY protocol;
   the SECURE SOCKETS LAYER protocol;
   the SECURE SHELL protocol; or
   a public key infrastructure.

20. A non-transitory computer-readable medium comprising one or more computer-readable instructions that, when executed by at least one processor of a computing device, cause the computing device to:
   establish an overlay network within a publicly available on-demand cloud computing platform, the overlay network enabling secure communications between devices by maintaining within the overlay network a services mapping table that defines access rights to at least one of shared data or services; and
   transfer data, by the overlay network acting as an intermediary, from a first device that has securely connected to the overlay network to a second device that has securely connected to the overlay network, in accordance with the access rights defined in the services mapping table;
   wherein:
   the overlay network enables secure communications between devices by further maintaining within the overlay network an access table that maintains a record in part of which target Internet protocol address of the publicly available on-demand cloud computing platform the first device used to connect to the overlay network;
   the target Internet protocol address is ephemeral; and
   a translation operation is performed to translate an identifier into a corresponding service port or network address to transfer the data.

* * * * *